United States Patent [19]

Yankovoy et al.

[11] 4,449,865

[45] May 22, 1984

[54] METHOD AND TOOL FOR GENERATING COUNTERSUNK HOLES IN COMPOSITE MATERIALS

[75] Inventors: Alexander Yankovoy; Theodore Ozer, both of Wallingford, Pa.

[73] Assignee: The Boeing Company, Seattle, Wash.

[21] Appl. No.: 322,625

[22] Filed: Nov. 18, 1981

[51] Int. Cl.³ .................... B23B 35/00; B23B 51/00
[52] U.S. Cl. ................................. 408/1 R; 408/224; 408/225
[58] Field of Search .............. 408/1 R, 211, 212, 213, 408/223, 224, 225; 407/34, 42, 53, 54

[56] References Cited

U.S. PATENT DOCUMENTS

| | | | |
|---|---|---|---|
| 1,643,679 | 9/1927 | Roderick | 408/225 |
| 1,711,012 | 4/1929 | Brandt | 408/224 |
| 2,403,861 | 7/1946 | Klemm | 408/224 |
| 2,415,329 | 2/1947 | Arndt | 408/224 |
| 2,529,143 | 11/1950 | Eriksson | 408/224 |
| 4,093,395 | 6/1978 | Luebbert | 408/224 |
| 4,338,050 | 7/1982 | Ozer et al. | 408/1 R |

FOREIGN PATENT DOCUMENTS

| | | | |
|---|---|---|---|
| 43771 | 1/1982 | European Pat. Off. | 408/1 X |
| 2074061 | 10/1981 | United Kingdom | 408/1 R |

OTHER PUBLICATIONS

Dupont Memo, Countersink for Composites of "Kovlar" Aramid, Sep. 1975.

*Primary Examiner*—William R. Briggs
*Attorney, Agent, or Firm*—Jones, Tullar & Cooper

[57] ABSTRACT

A method and tool for drilling countersunk holes in a composite of materials having different strength and elastic characteristics. The tool includes a front hole cutting section for initially generating the hole, and a rear countersink cutting section providing an enlarged tapered entrance to the hole. The tool has a single flute which extends axially along the length of the front and rear tool cutting sections. The front cutting section includes a planar end surface which is inclined relative to the tool axis and which defines with the flute and a cylindrical outer surface of this section, a single end cutting point and adjacent radial and longitudinal cutting edges. The rear cutting section includes an outer surface which extends radially outward and axially rearward from the front cutting section, and which intersects a leading side of the flute at an acute angle to define a countersink cutting edge. The method provides for simultaneous point and surface cutting of the composite to form an initial hole, and subsequent cutting of the composite to form the enlarged tapered entrance to the hole. Point and surface cutting occur at the outer circumferential surface of the hole.

8 Claims, 8 Drawing Figures

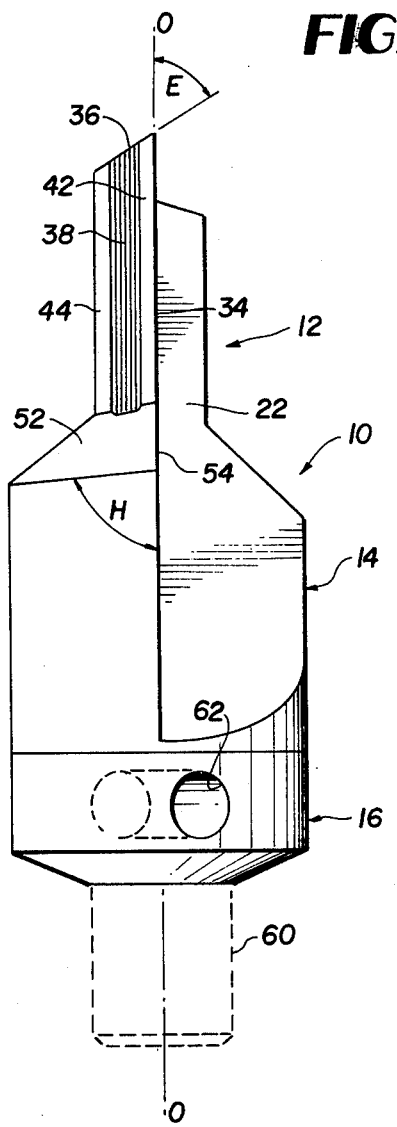
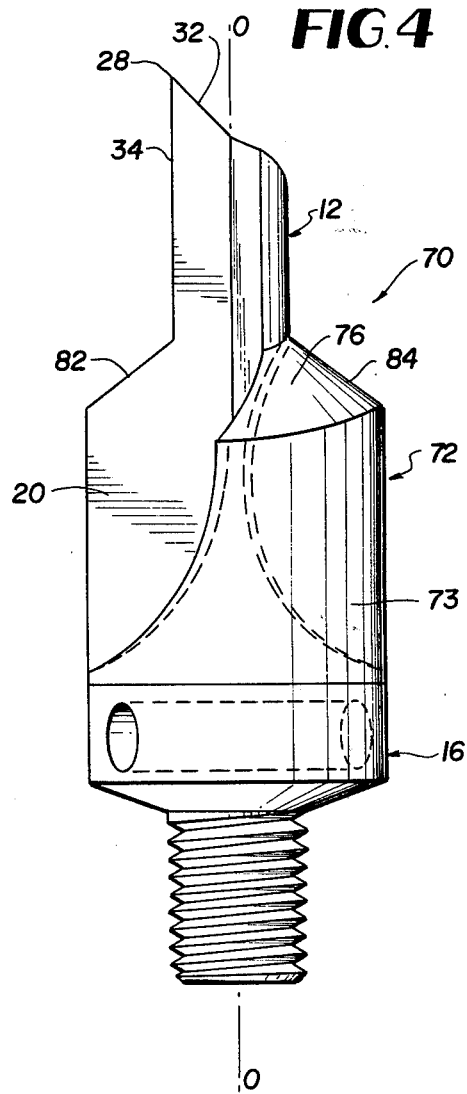

METHOD AND TOOL FOR GENERATING COUNTERSUNK HOLES IN COMPOSITE MATERIALS

CROSS-REFERENCE TO RELATED APPLICATION

This application discloses subject matter which relates to that disclosed in copending application, Ser. No. 166,868, filed July 17, 1980 now U.S. Pat. No. 4,338,050.

BACKGROUND OF THE INVENTION

The invention relates in general to generating holes in composites, and in particular, to generating countersunk holes in composites comprising at least two materials having different moduli of elasticity with a combination drill/countersink tool.

In the past, it has been difficult to quickly and accurately drill holes in composite material, such as, for example, aramid fiber/epoxy or other resin-bonded laminates. Experience has shown that the aramid fibers, which have a smaller diameter and a higher tensile strength, modulus of elasticity, and shear resistance than the more conventional glass fibers used in similar composite compositions, tend to deflect and bend before being cut by the shearing action of the cutting edge of the drill. This action forces the fibers into the softer resilient resin matrix material, increasing radial compressive forces on the drill and the surrounding composite material. These compressive forces generate frictional heat which further softens the resin matrix, by allowing the rough aramid fiber to further escape the shearing action of conventional drills. The heat generated also limits the drill speed and feed pressure so that the material surrounding the drill hole is not damaged by excessive heat. Also, as a result of this characteristic of aramid fiber reinforced resin laminates, holes drilled by conventional means are often undersized holes with frayed, fuzzy edges, and with mushrooming of the aramid fibers occurring at the tool exit.

The above-referenced U.S. patent application Ser. No. 166,868 disclosed an optimized method and tool for quickly and easily generating both shallow and deep holes with clean hole edges in composites of materials with different moduli of elasticity.

The method provides for simultaneous point and surface cutting. Point and surface cutting occur at the outer circumferential surface of the hole and generally along a radius of the hole to be drilled. At the outer circumferential surface, the point cutting proceeds normal to the planar area of the hole, while the surface cutting proceeds circumferentially.

The tool, which is generally shaped as a cylindrical rod, has an axially extending flute and an end surface which is inclined to the tool axis. The intersection of the end surface with one side surface of the flute, the intersection of the end surface with the semi-cylindrical outer surface of the rod, and the intersection of the one end surface of the flute and semi-cylindrical outer surface of the rod define a cutting angle end point and associated cutting edges. The end surface intersects the one side of the flute adjacent the end point at an acute angle to form a first cutting edge. The same side of the flute intersects the outer surface adjacent the end point to form the second cutting edge. The second cutting edge intersects the first cutting edge at an acute angle at the single end point. The end surface also intersects the semi-cylindrical outer surface to form a third edge which intersects the first and second cutting edges at the single end point at respective acute angles.

During a hole forming operation, the single end point first cuts the composite and thereafter penetrates successive transverse planes of the composite, i.e., transverse to the longitudinal axis of the hole to be generated, and the portions of the cutting edges immediately adjacent the single end point cleanly cuts the fibers of the composite of each successively cut transverse plane in the immediate region of penetration. Penetration is facilitated by the two cutting edges and the third edge adjacent the single end point. The first cutting edge also cuts away chips from the cylindrical composite portion to be removed to form the hole progressively inward. By penetrating the composite and severing the fibers in the immediate region of the penetration, very little deflection of these fibers occurs; thus, the radial compressive forces exerted on the tool by these fibers and the thrust requirements of the tool are reduced to a minimum, and an accurately sized, clean-cut hole is produced.

In some applications of the composite material described above, it is necessary to form countersunk holes therein, that is, holes having enlarged entrance portions for receiving the heads of screws or bolts inserted therein, in order to satisfy flush installation requirements.

OBJECTS AND SUMMARY OF THE INVENTION

Therefore, it is the object of the invention to provide an optimized method and combination drill/countersink tool for generating accurate countersunk holes with clean hole edges in a composite of at least two materials in which one material has a higher modulus of elasticity than the other material.

It is a further object of the invention to provide an optimized method and tool for generating countersunk holes in composites according to which less heat is generated during the cutting operation than prior known methods and tools, to thus allow higher cutting speeds and the use of cutting edges formed from a very hard material, such as a metal carbide.

It is still another object of the invention to provide an optimized combination drill/countersink tool for generating countersunk holes in composites of the materials described above which is relatively easy and inexpensive to manufacture.

The method provides for simultaneous point and surface cutting of the inner hole portion. Point and surface cutting occur at the outer circumferential surface of this hole portion and generally along a radius of the inner hole portion to be drilled. At the outer circumferential surface of this hole portion, the point cutting proceeds normal to the planar area of the hole portion, while the surface cutting proceeds circumferentially. At the countersunk entrance portion of the hole to be drilled, surface cutting occurs at the outer circumferential surface of the countersunk hole portion, and generally along a line extending radially and axially from the hole axis to the countersunk hole entrance.

The combination drill/countersink tool described herein includes a front hole cutting section for generating a hole with clean cut edges in composite materials with different moduli of elasticity, and a rear countersink cutting section for providing an enlarged tapered entrance to the hole generated by the front cutting section, when this tool, relative to the composite, is rotated about its axis in a predetermined direction of rotation it is moved axially in a forward direction against the composite.

The tool has a single flute which extends axially along the length of both the front and rear cutting sections of the tool.

The front cutting section of the tool is essentially the same as the hole cutting tool described in our U.S. application Ser. No. 166,868, filed July 7, 1980. This front cutting section includes a planar front end surface which is inclined at an acute angle to the tool axis, and a generally semi-cylindrical outer surface which extends from the front end surface in a rearward axially direction to the adjacent rear cutting section. The single flute extended axially along the front cutting section is defined by two leading and trailing flute side surfaces which extend radially inward from the semi-cylindrical outer surface and axially rearward from the planar front end surface.

The leading flute side surface intersects the planar front end surface to form a first cutting edge and intersects the semi-cylindrical outer surface to form a second cutting edge. Also, the planar front end surface intersects the semi-cylindrical outer surface to form a third edge, with the first, second and third edges intersecting at a common single end cutting point. The geometry of this single end cutting point and its associated cutting edges is such that the first and second cutting edges intersect at an acute angle at the single end cutting point and the third edge intersects the first and second cutting edges at respective acute angles at this single end cutting point.

The rear cutting section of the tool is approximately shaped as a truncated cone, having portions removed to form the back portion of the axially extending flute. The second cutting section includes an outer surface which extends radially outward and axially rearward from the semi-cylindrical outer surface of the first cutting section, and intersects the leading flute side surface at an acute angle to form a fourth cutting edge.

During a hole forming operation, the single end point first cuts the composite and thereby penetrates excessive transverse planes of the composite, i.e., transverse to the longitudinal axis of the hole to be generated, and the portions of the cutting edges immediately adjacent the single end point cleanly cuts the fibers of the composite at each successively cut transverse planes in the immediate region of the penetration. Penetration is facilitated by the two cutting edges and the third edge adjacent the single end point. The first cutting edge also cuts away chips from the cylindrical composite portion to be removed to form the hole progressively inward, and directs these chips away from the side of the hole and longitudinally through the passage formed by the flute and the side of the hole, which has a relatively large cross-sectional area, typically one-third of the hole cross-sectional area, for rapid and efficient chip removal.

After the tool has been moved axially forward into the composite for the length of the first cutting section, the acute countersink cutting edge begins to penetrate the composite at the entrance of the hole formed by the first cutting section. As rotation and forward axially movement of the tool continues, the acute countersink cutting edge cleanly cuts away the chips from the composite adjacent the hole entrance to form an enlarged, tapered hole entrance portion progressively outward, and directs these chips away from the side of the tapered entrance hole portion and longitudinally through the passage formed by the flute in the side of the tapered hole entrance.

By penetrating the composite and severing the fibers in the immediate region of the penetration, very little deflection of these fibers occurs. Consequently the radially compressive forces exerted on a tool by these fibers, the thrust requirements of the tool, and frictional heating of the tool in the composite are reduced to a minimum, due primarily to the geometry of the single end cutting point and the acute countersink cutting edge. Thus, the higher cutting speed can be used, to allow the use of carbide tooling which normally requires a minimum cutting speed for high performance. For example, the tool can include a shank end portion which is connectable to a rotary cutting device and which includes an insert of hard material, such as tungsten carbine or titanium carbide, forming the front and rear cutting sections of the tool.

Also, portions of the semi-cylindrical outer periphery of the tool front end portion may be ground to form three parallel, axially extending, wear strips similar to those of a gun-type drill, which guide the tool and allow the tool to be used for generating relatively deep holes.

Since aramid fiber/epoxy composites tend to expand radially in all directions while being drilled and to contract slightly as the drill tool is removed, the portion of the semi-cylindrical outer periphery of the tube adjacent the drilling side of the flute is flattened to provide a gradual transition of radial compressive stresses as a final wear strip rotates within the hole.

While the tool includes only a single flute which extends axially along both the front and rear cutting sections, the rear cutting section may include additional axially extending flutes which form, with the outer tapered surface of the rear cutting sections, additional fourth acute cutting edges.

The above and other objects and features of the invention will become apparent from the following description of preferred embodiments of the invention.

BRIEF DESCRIPTION OF THE DRAWINGS

FIG. 3 is another side view of the embodiment shown in FIG. 1, rotated approximately 90° from the position of FIG. 1;

FIG. 4 is a side view of a second embodiment of the invention, viewed with one side of the flute of the tool end cutting portion in the plane of the paper;

DESCRIPTION OF PREFERRED EMBODIMENTS

Tool

Figures 1, 2, 5:
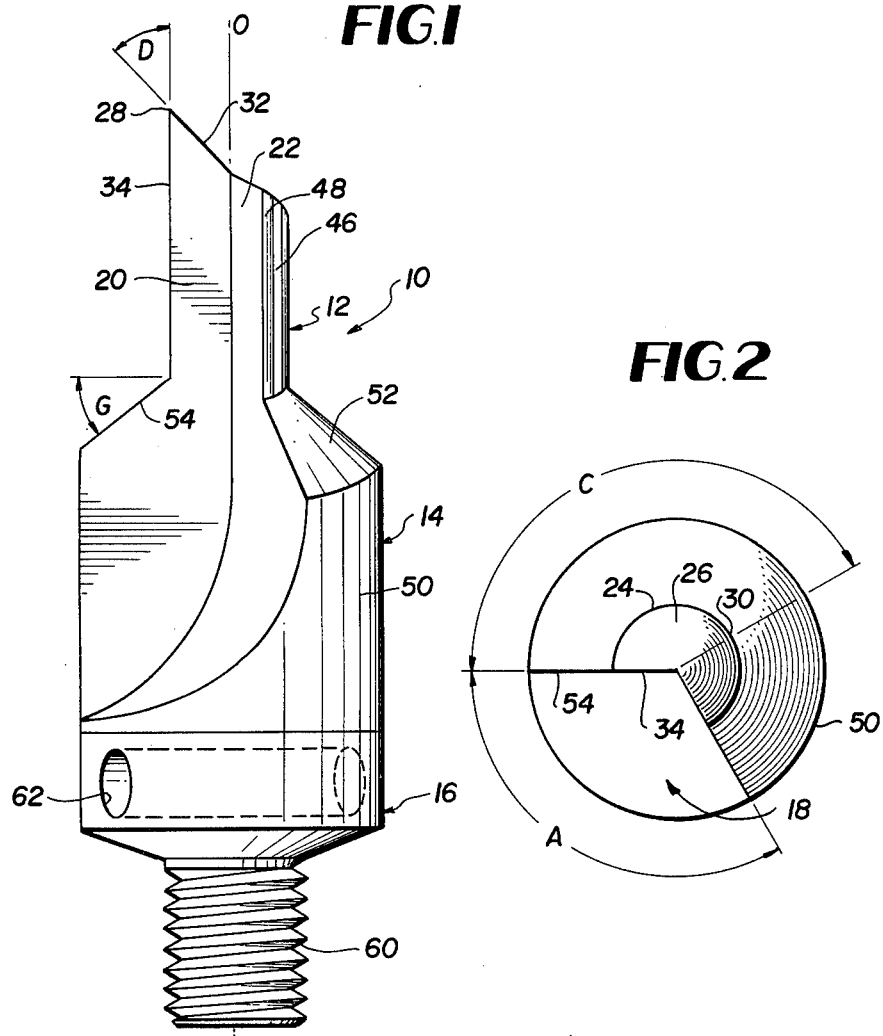
FIG. 1 is a side view of a tool for generating countersunk holes, according to the invention, viewed with one side of a flute surface of the tool disposed in the plane of the paper.
FIG. 2 is a top view of the embodiment of FIG. 1.
FIG. 5 is a top view of the embodiment of FIG. 4.

Referring to FIGS. 1-3, a countersunk hole drilling tool 10 includes an end cutting portion 12, and intermediate cutting portion 14, and a steel shank portion 16. The end and intermediate cutting portions 12, 14, are formed as an insert of hard material, such as tungsten carbide or titanium carbide, which is joined to the shank portion 16 in a conventional manner, such as brazing.

The end cutting portion 12 is essentially the same as the hole cutting tool described in our U.S. patent application Ser. No. 166,868, filed July 7, 1980, which is hereby incorporated by reference. The end cutting section 12 includes longitudinally extending V-shaped flute or groove 18, which is defined by two planar side surfaces 20, 22, which extend radially inward from a generally semi-cylindrical outer surface 24 to at least the axis O-O of the tool 10, and intersect at an obtuse angle A, which preferably falls within the range of 110°-130°.

Figure 7:
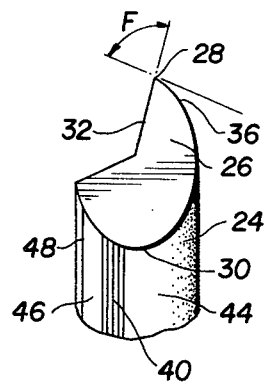
FIG. 7 is a top end view of the cutting end portion of either the embodiment of FIG. 1 or the embodiment of FIG. 4.

The end cutting portion 12 has a planar end insurface 26 which is inclined at an angle, for example, 35°, to a horizontal plane orthogonal to the axis O-O, so that it is shaped as an elipse having one portion removed to form the flute 18, seen in FIG. 7. The planar end surface 26 intersects the outer surface 24 and the flute side surface 20 at a common end point 28 which, when the tool 10 is rotated in a counter-clockwise direction as seen in FIG. 2, leads the lowest point 30 of the planar end surface 26 by an obtuse angle C less than 180°, preferably in the range of 150°-165°.

The planar end surface 26 intersects the leading flute side surface 20 adjacent the single end point 28 at an acute angle, typically in the range of 15°-25°, to form a first cutting edge 32, as shown in FIG. 3. The flute side surface 20 intersects the outer surface 24 at a 90° angle, as shown in FIG. 2, to form a second cutting edge 34 which intersects the first cutting edge 32 at an acute angle D, preferably in the range of 20°-65°, at the end point 28, as shown in FIG. 1. Also, the planar end surface 26 intersects the outer surface 24 to form a third edge 36 which intersects the second cutting edge 34 at an acute angle E and intersects the first cutting edge 32 at an acute angle F, as shown in FIG. 7.

Two axially-extending segments 38, 40 of the outer semi-cylindrical surface 24 are slightly recessed (typically 0.003 inch) to provide radial clearance at these portions and to define three, spaced-apart, wearstrips 42, 44, 46, which extend the length of the end cutting portion 12 and serve as axial guides for the tool 10 during a hole-forming operation. Also, the outer surface 24 includes an axially-extending, recessed transition segment 48 adjacent the flute side surface 22, to provide a gradual transition of radial compressive stresses as the final wearstrip 46 rotates within the hole formed in the composite material, as discussed in the above referenced U.S. patent application, Ser. No. 166,868.

The intermediate cutting portion 14 of the tool 10 includes a semi-cylindrical outer surface 50, and a tapered outer surface 52 which extends radially outer and axially towards the shank portion 16 between the outer surface 24 of the end cutting portion 12 and the outer surface 50 of the intermediate cutting portion 14. The flute 18, which extends axially towards the shank portion 16 past the tapered outer surface 52 is gradually terminated in the intermediate cutting portion 14 by the trailing flute side 22, which is curved along the leading flute side 20 to intersect the outer cylindrical surface 50 and thus terminate the flute 18.

The tapered outer surface 52 intersects the leading flute side 20 to form a countersink cutting edge 54 which extends axially and radially from the second cutting edge 34 at an angle G to the horizontal plane which determines the taper of the entrance portion of the hole formed by the tool 10. Typically, the countersink cutting edge 54 is a straight edge having an angle of inclination G of approximately 40°. However, the countersink cutting edge 54 could be curved, or its angle of inclination G could be greater or less than 40°, depending on the shape and taper of hole entrance desired.

The tapered outer surface 52 extends from the countersink cutting edge 54 helically about the tool axis O-O toward the shank portion 16, so that the tapered outer surface 52 intersects the planar leading flute side 20 at an acute angle H to thus provide radial clearance toward the hole-forming operation.

The optimum range of value for the angle H will depend on such factors as the type of composite material being drilled, the tool material, the hole entrance diameter and taper, and the drilling speed. The minimum value for the angle H is largely determined by the characteristics of the tool material and the cost of manufacturing the tool 10. For example, breakage and wear increase, and heat production decreases as the angle H decreases. Also, the time required to form the tool 10 by grinding a very hard material, such as tungsten carbide increases as the angle H decreases.

The maximum value for the angle H is largely determined by the characteristics of the composite material being drilled. As the angle H is increased, fraying and mushrooming is more apt to occur at the entrance portion of the countersunk hole which is formed by the countersink cutting edge 52. For most composites, it is preferable that the angle H not exceed 78°. A typical value for the angle H is approximately 70°.

The end and intermediate cutting portions 12, 14 are formed from a single insert of carbide material which is brazed onto a cylindrical base 58 of the shank portion 16. The shank portion 16 includes an axially extending threaded stud 60 for securing the tool 10 to a drilling machine. Also, the shank portion 16 may include an opening 62 extending diametrically through the base 58, for receiving a bar or shaft, to facilitate mounting and removing the tool 10 from the drilling machine.

Figure 6:
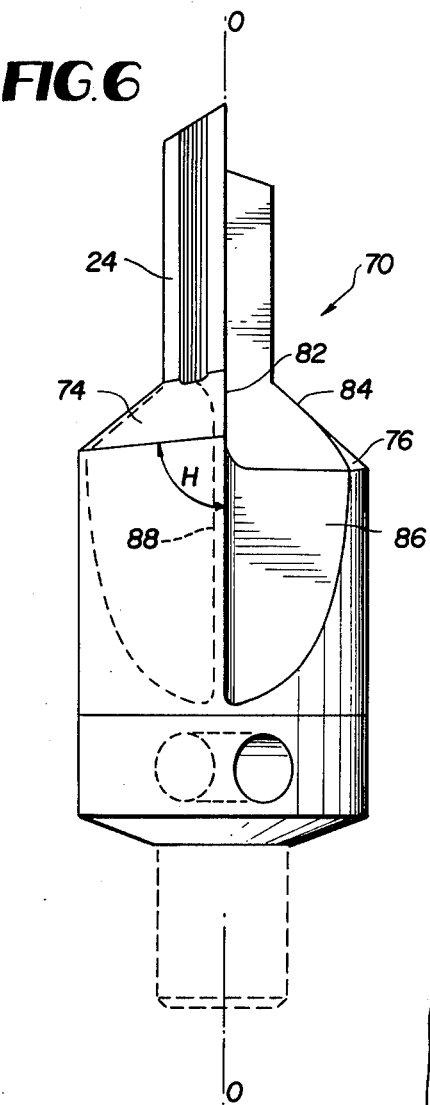
FIG. 6 is another side view of the embodiment of FIG. 4, rotated approximately 90° from the position of FIG. 4.

In a second embodiment on the invention shown in FIGS. 4-6, the hole-drilling tool 70 includes an end cutting portion 12 and a shank portion 16 which is essentially identical to the end cutting portion 12 and shank portion 16 of the tool 10 described above.

The cutting tool 70 includes an intermediate cutting section 72 which, like the intermediate cutting section 14 of the tool 10, is integrally formed with the end cutting section 12 in a carbide material insert brazed to the steel shank portion 16 of the tool 70. The intermediate cutting portion 72 including a semicylindrical outer surface 73 and two tapered outer surfaces 74, 76 which extend from the outer surface 24 of the end cutting section 12 radially outward and axially toward the shank portion 16, similar to the outer surfaces 50, 52 of the tool 10, described above.

The primary difference between the tool 70 and the tool 10 is that the intermediate cutting section 72 of the tool 70 includes two axially-extending flutes 78, 80 which define, with the two outer tapered surfaces 74, 76, two cutting edges 82, 84 which determine the shape and taper of the entrance portion of the hole formed by the tool 70.

The flute 78 is defined by the leading planar flute side 20 which extends radially along the tool axis O-O, and by a trailing flute side 86 which intersects the leading flute side 20 adjacent to the tapered outer surfaces 74, 76 inwardly of the outer surface 24. The trailing flute side 86 is curved outwardly towards the intersection of the leading flute side 20 with the outer surface 73, to thus terminate the flute 78 at a lower portion of the intermediate cutting portion 70. At the upper end of the intermediate cutting portion 70, the trailing flute side 22 is curved towards the intersection of the leading flute side 20 and the tapered outer surface 74, to thus intersect the trailing flute side 86, so that the flute 78 is in communication with, and is an extention of, the flute 18 of the end cutting portion 12.

The flute 80 of the intermediate cutting portion 72 is approximately V-shaped in cross section, and is defined by a leading planar flute side 88 which extends radially along the tool axis O-O, and by a curved, semi-cylindrical shaped trailing flute side surface 90 which intersects the leading flute side 88 along a curved line extending from the outer surface 24 of the end cutting portion 12 at one end of the flute 80 to the outer surface 73 at the other end of the flute 80.

The leading planar flute side 20 intersects the outer tapered surface 74 to form the cutting edge 82, which is essentially identical to the fourth cutting edge 54 of the tool 10, described above. Similarly, the leading planar flute side 88 intersects the tapered outer surface 76 to form the cutting edge 84, which is also essentially the same as the above described countersink cutting edge 54. The tapered outer surfaces 74, 76 extend helically about the tool axis O-O in the same manner as the tapered outer surface 52 of the tool 10, so that these tapered outer surfaces 74, 76 intersect the flute sides 20, 88, respectively, at the acute angle H described above in connection with the tool 10. The two taper cutting edges 82, 84 are generally disposed in a common plane with the tool axis O-O. Also, since it is unnecessary for the flutes 78, 80 of the intermediate cutting portion 70 to extend to the tool axis O-O, the leading and trailing flute sides of each flute 78, 80 may be smoothly joined by a rounded inner portion of the flute.

As shown in FIG. 5, the leading flute side 20 is disposed at an acute angle J, typically 78°, to the trailing flute side 86 of the same flute 78, and the leading flute side 88 is disposed at the same angle J to the trailing flute side 90 of the flute 80.

To demonstrate the effect of varying the angle H of the tool 70 on the quality of the countersunk hole formed by the tool 70, holes were drilled at 500 rpm in two identical specimens, each including an approximately 0.08 inch thick laminated Kevlar/epoxy composite attached to an approximately 0.03 inch thick aluminum plate, by two tools 10, having 0.500 inch diameter intermediate cutting portions 12 and identical 0.193 inch diameter end cutting portions 12. The only difference between the two tools 70 was that the angle H of one tool was approximately 78° (12° clearance) whereas the angle H of the other tool was approximately 84° (only 6° clearance).

The tool 70 having an angle H of 78° formed a countersunk hole of excellent quality with clean hole edges and no delamination or fuzzing. However, the holes formed by the tool 70 having an angle H of 84° were of poor quality, with fuzzing and delamination occurring around the edges of the tapered entrance portions of these holes. Also, in some of these holes, delamination occurred at the inner end of the tapered countersunk hole entrance portion.

Method

Figure 8:
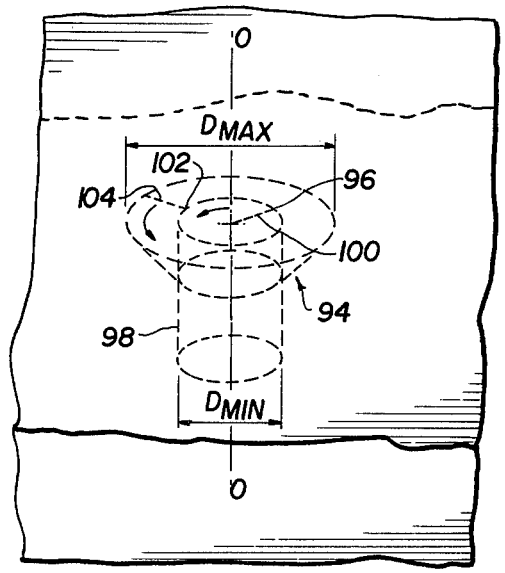
FIG. 8 is a schematic view of a composite in which a countersunk hole is to be generated in accordance with the invention.

Referring to FIG. 8, a composite 92 is schematically illustrated in which a countersunk hole 94 is to be drilled. The hole 94 is to have a central axis O-O (which coincides with the axis O-O of the tool 10) a maximum diameter $D_{max}$ at its entrance, and a minimum inner diameter $D_{min}$. When the tool 10 is used to generate the hole 94, it is rotated about its axis O-O in a counter-clockwise direction, as seen in FIG. 2, and moved in an axial direction to engage the cutting single end point 24 with the composite 94 at a point 96 on the composite surface. The tool 10 is guided within a conventional hardened guide bushing (not shown), which is well known to the art. The sharp cutting single end point 28 at the intersection of the first and second cutting edges 32, 34 first engages the composite 92 to cleanly cut the outermost fibers at the point 96 and commence successive penetration of parallel transverse planes of the composite 92 in the direction of the axis O-O and about a cylindrical circumferential surface 98 of the hole being formed. As the single end point 28 cuts and penetrates the composite 92, the portions of the cutting edges 32 and 34 immediately adjacent the single end point 28 cut the composite 92 along 98 and 100, respectively. In addition, the first cutting edge 32 progressively engages the composite 92 along, what can be considered a revolving radius 100, starting at the point 96, to cut chips therefrom which are axially directed through the flute 18.

The three wearstrips 42, 44, 46, guide the tool within that portion of the hole previously cut so that the cutting single end point 28 produces a straight hole in the composite 92. The transition segment 48 prevents stretching or additional cutting of the more elastic component material of the composite by the tool edge formed by the outer surface 24 and the flute side 22, and thus contributes significantly to the hole quality.

After the tool 10 has engaged the composite 92 and been moved axially the length of the end cutting portion 12, the inner end of the tool cutting edge 54 intersecting the cutting edge 34, engages the composite 92 at a point 102 (which may coincide with the point 96). As the counter-clockwise rotation and axial movement of the tool 10 continues, the cutting edge 54 progressively engages the composite 92 along what can be considered a revolving radial segment 104, starting at the point 102, to cut chips therefrom, which are axially directed through the flute 18, until the desired entrance diameter $D_{max}$ has been achieved.

The tool 70 generates a countersunk hole in a manner similar to that of the tool 10, except the cutting edge 82, corresponding to the cutting edge 54 of the tool 10, progressively engages the composite, starting at the point 102, and simultaneously, the cutting edge 84 progressively engages the composite, starting at a point diametrically opposite the point 102.

Since there are many variations and modifications of the above-described preferred embodiments of the invention which would be obvious to a person skilled in the art, it is intended that the scope of the invention be limited only by the appended claims.

What is claimed and desired to be protected by Letters Patent of the United States is:

1. A tool, having an axis, for generating a countersunk hole in a composite of at least a first material and a second material having a higher modulus of elasticity than the first material when the tool, relative to the composite, is rotated about its axis in a first direction of rotation and is moved in a forward axial direction against the composite, the tool comprising;

a planar front end surface;
a generally semi-cylindrical first outer surface which extends from the front end surface in a rearward axial direction;
a second outer surface which extends radially outward and axially rearward from the first outer surface;
first and second flute side surfaces which extend radially inward from the first and second outer surfaces and axially rearward from the front end surface to define an axially extending first flute of the tool;
wherein the first flute side surface intersects the front end surface to form a first cutting edge and intersects the first outer surface to form a second cutting edge, the front end surface intersects the first outer surface to form a third edge, the first, second and third edges intersecting at a common single end cutting point, with the first and second cutting edges intersecting at an acute angle at the single end cutting point and with the third edge intersecting the first and second cutting edges at respective acute angles at the single end cutting point; and
wherein the first flute side surface intersects the second outer surface to form a countersink cutting edge, the second outer surface extending from the countersink cutting edge helically about the tool axis in a rearward axial direction so that the first flute side surface intersects the second outer surface at an acute angle at each point along the fourth cutting edge.

2. A tool, as described in claim 1, wherein the first flute side surface intersects the second outer surface at an acute angle not exceeding 78°.

3. A tool, as described in claim 1, wherein the countersink cutting edge is a straight edge.

4. A tool, as described in claim 1, which further comprises:

third and fourth flute side surfaces which extend radially inward from the second outer surface and axially rearward from the first outer surface to define a second axially extending flute of the tool, the third flute side surface intersecting the second outer surface to form a second countersink cutting edge diametrically opposite the first countersink cutting edge;
wherein the second outer surface comprises
a first surface portion which extends from the countersink cutting edge helically about the tool axis in the rearward axial direction so that the first flute side intersects the first surface portion at an acute angle at each point along the countersink cutting edge, and
a second surface portion which extends from the second countersink cutting edge helically about the tool axis in the rearward axial direction so that the third flute side intersects the second surface portion at an acute angle at each point along the second countersink edge.

5. A tool, as described in claim 4, wherein the acute angle at which the first flute side surface intersects the first surface portion of the second outer surface, and the acute angle at which the third flute side surface intersects the second surface portion of the second outer surface, are angles which do not exceed 78°, respectively.

6. A tool, as described in claim 4, wherein the first and second countersink cutting edges are straight edges.

7. A method of generating a countersunk hole in a composite of at least a first material and a second material having a higher modulus of elasticity than the first material, the hole being generated having a longitudinal axis, a countersunk portion which extends axially inward from an outer surface of the composite, and an inner portion which extends axially inward from the countersunk portion, the hole inner portion having a constant minimum diameter and the hole countersunk portion having a diameter which increases from the minimum diameter at the hole inner portion to a maximum diameter at the composite outer surface, the method comprising the steps of:

cutting and continuously penetrating the composite at a minimum circumferential surface limit of the hole corresponding to the minimum hole diameter and at a point which travels about the minimum circumferential surface and in the inward direction of the longitudinal axis of the hole being generated;
simultaneously cutting the composite continuously about the minimum circumferential surface and along a revolving radius of the hole being generated, wherein the revolving radius is inclined relative to the longitudinal axis of the hole; and
cutting the composite continuously along at least one revolving, radially-extending line which also travels in the inward direction of the hole axis, the revolving line being inclined relative to the hole axis so that the composite is progressively cut along said revolving line, starting at the junction of the hole minimum circumferential surface and the composite outer surface, said revolving line travelling axially inward until a point of the revolving line adjacent the composite outer surface cuts the composite along a maximum circumferential surface limit corresponding to the maximum hole diameter.

8. A method of generating a countersunk hole, as described in claim 7, wherein the at least one revolving, radially-extending line comprises a plurality of lines symmetrically spaced about the hole axis.

* * * * *